Patented Dec. 22, 1925.

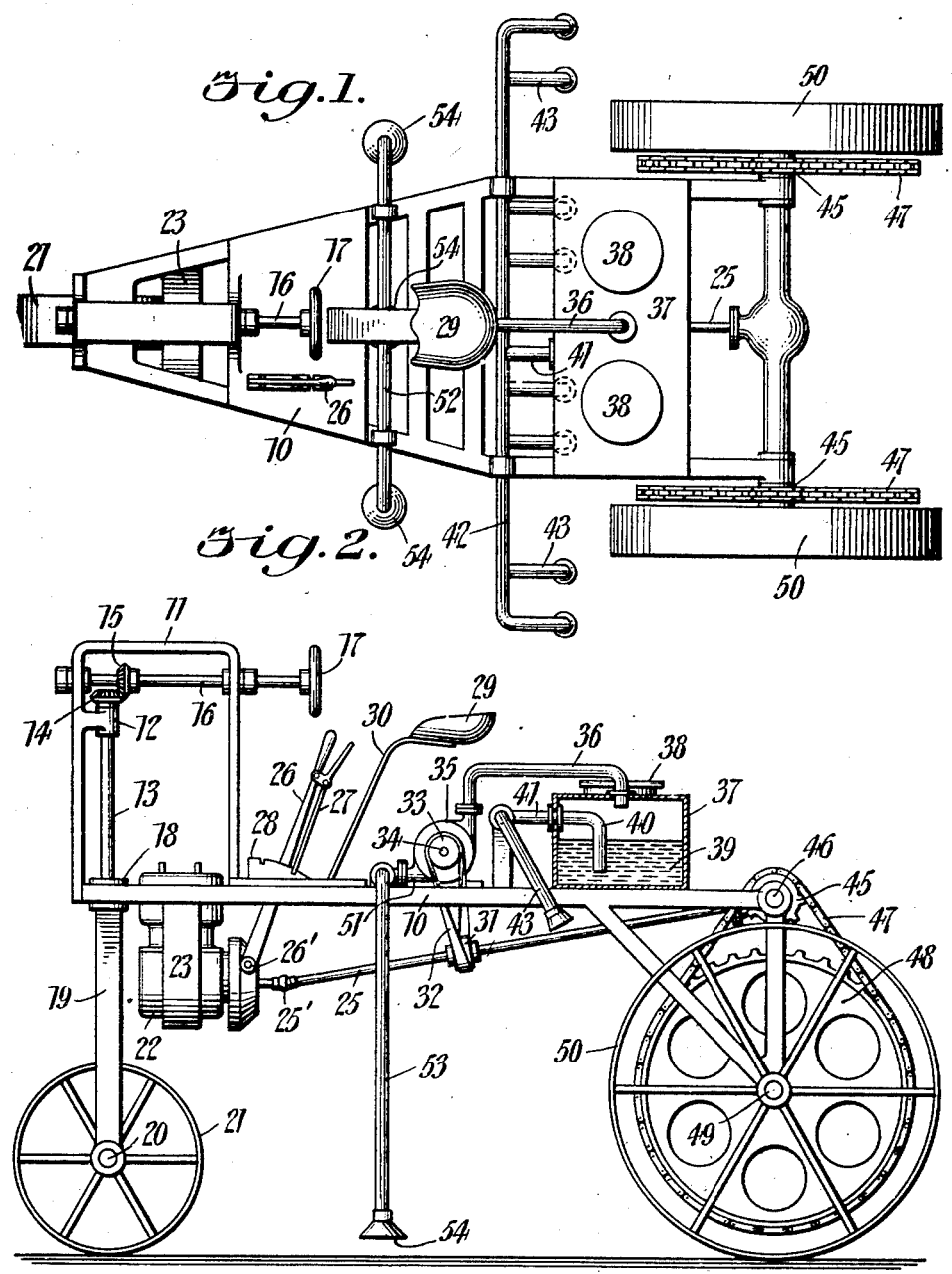

1,566,925

UNITED STATES PATENT OFFICE.

RICHARD ROKOHL, OF ORANGE GROVE, TEXAS.

INSECT EXTERMINATOR.

Application filed December 11, 1924. Serial No. 755,126.

*To all whom it may concern:*

Be it known that I, RICHARD ROKOHL, a citizen of the United States, residing at Orange Grove, in the county of Jim Wells and State of Texas, have invented certain new and useful Improvements in Insect Exterminators, of which the following is a specification.

This invention relates to improvements in insect destroyers and particularly to an apparatus for spraying liquid insecticide on cotton plants or the like for the destruction and extermination of boll-weevils or like insects.

It is the principal object of the invention to provide an apparatus for spraying a plurality of cotton plant rows simultaneously with a liquid insecticide and which is furthermore adapted to catch the boll-weevils and collect the same together with cotton buds which may have fallen to the ground.

Another object of the invention is the provision of an apparatus of this character which is motor driven and of an extremely simple and inexpensive construction.

A further object of the invention is the provision of an apparatus of this class which can also be used as a cultivator or the like without vital changes in its construction.

A still further object of the invention is the provision of a boll-weevil catcher in which a pump is employed to spray the insecticide and for creating a vacuum to operate the suction device for catching the boll-weevils.

These and other objects and advantages of the invention will become more fully known as the description thereof proceeds, and will then be specifically pointed out in the appended claims.

In the accompanying drawing, forming a material part of this disclosure:—

Figure 1 is a top plan view of an apparatus constructed according to the present invention.

Figure 2 is a side elevation thereof, partly in section.

The apparatus or machine comprises a frame 10 carrying at its front end, a yoke 11 equipped with bearings 12 for the upper end of a vertical spindle 13 carrying a bevel gear 14 at its end in mesh with another bevel gear 15 on a horizontal shaft 16 intermediate the length thereof. The shaft 16 is journalled below the cross bar of the yoke and one of its ends projects beyond the yoke and carries a hand steering wheel 17.

The spindle 13 is secured to a collar 18 at the upper end of a steering fork 19 between the prongs of which the axle 20 for the front or steering wheel 21 is journalled.

A motor 22 of any suitable type is suspended by means of a hanger or the like 23 from the frame 10. The motor shaft carries a clutch member 24 for coupling the motor to a shaft 25 having a universal joint 25'.

The clutch member is operated by means of a lever 26 pivoted in the frame 10 and equipped with the customary locking rod 27 adapted to grip between the teeth of a block 28 on frame 10.

A seat 29 for the operator is provided in front of the steering hand wheel 17 and is supported from the frame 10 by a bracket 30 to the upper end of which it is secured.

Intermediate its ends the shaft 25 carries a pulley 31 or the like over which is guided a belt 32 which is also guided over a pulley 33 on the shaft 34 of a pump within a casing 35 connected by a pipe 36 to a tank 37 extending through the top thereof and ending immediately below the same. This tank has removable covers 38 allowing inspection and resupplying of the tank with the insecticide indicated at 39.

The pump is supplied with an inlet 51 communicating with a header 52 bent at right angles downwardly to produce suction pipes 53 terminating near the surface of the soil in suction heads 54.

A second pipe 40 extends into the tank and ends near the bottom thereof and is connected by means of a pipe 41 with a spray pipe 42 equipped with a plurality of nozzles 43 arranged in groups of two. Pipe 42 and nozzles are so constructed and arranged in the apparatus that they may be elevated above the ground or removed if the apparatus is to be transported or to be used as an ordinary cultivator in which case the pipe holding or suspending means serve to hold the cultivating implements.

The shaft 25 carries gearing (not shown) adapted to drive sprocket wheels 45 on shaft 46 over which chains 47 are guided and which are trained over large sprocket gears 48 on the rear axle 49, carrying the rear traction wheels 50 in the usual manner.

The apparatus operates, as will be readily understood from the above description, by coupling the motor to the drive shaft and operating the pump to spray the liquid insecticide simultaneously over a plurality of rows of cotton plants and the pump by creating a vacuum in the tube will operate to suck the exterminated boll-weevils and cotton buds fallen to the ground into the tank through the heads 54, pipes 52 and 53 and pump 35 from which they can be easily collected and removed.

The steering is effected in the customary manner.

It will be clear that changes may be made in the general arrangement of the apparatus and in the construction of the minor parts thereof without departure from the scope of the invention as defined in the appended claim.

Having thus described my invention, what I claim as new and desire to secure by Letters Patent, is:—

An insect exterminator and catcher comprising a pump, a tank partly filled with an insecticide, a pipe discharging into said tank from the pump, a spray pipe communicating with the tank and directed towards the earth, a plurality of spray nozzles on said spray pipe arranged in spaced groups to spray a plurality of plant rows simultaneously, and a pair of inlets to said pump to suck insects into said tank.

In witness whereof I have affixed my signature.

RICHARD ROKOHL.